United States Patent [19]
Oshiba

[11] Patent Number: 5,226,026
[45] Date of Patent: Jul. 6, 1993

[54] OPTICAL CARD REPRODUCING APPARATUS PROVIDED WITH A FUNCTION OF GENERATING PSEUDO SYNCHRONIZING PATTERN DETECTING SIGNALS

[75] Inventor: Mitsuo Oshiba, Hachioji, Japan

[73] Assignee: Olympus Optical Co. Ltd., Tokyo, Japan

[21] Appl. No.: 764,736

[22] Filed: Sep. 24, 1991

[30] Foreign Application Priority Data

Sep. 25, 1990 [JP] Japan ................................ 2-256174

[51] Int. Cl.⁵ ............................ G11B 7/00; G11B 5/09
[52] U.S. Cl. ........................................ 369/48; 369/54; 369/59
[58] Field of Search .................. 369/47, 48, 58, 54, 369/59, 60, 32, 44.26, 275.1, 275.3; 235/454, 476, 483; 250/201.5; 360/2, 7, 39, 40, 41, 51; 358/335, 337

[56] References Cited

U.S. PATENT DOCUMENTS

| | | | |
|---|---|---|---|
| 4,672,597 | 6/1987 | Yamazaki | 369/59 |
| 4,853,920 | 8/1989 | Hosoya et al. | 369/59 |
| 4,862,443 | 8/1989 | Tsuji et al. | 369/59 |
| 4,885,458 | 12/1989 | Horiguchi et al. | 235/454 |
| 4,908,811 | 3/1990 | Yokogawa et al. | 369/60 |
| 5,065,384 | 11/1991 | Yokogawa | 369/59 |

*Primary Examiner*—Aristotelis Psitos
*Assistant Examiner*—Thang V. Tran
*Attorney, Agent, or Firm*—Armstrong, Westerman, Hattori, McLeland & Naughton

[57] ABSTRACT

For a recording medium wherein respective sectors forming respective tracks are sectioned into a plurality of blocks consisting of data regions in which data are recorded and pattern parts representing to be data top portions, there is provided a generating circuit in which the timing when a pattern detecting signal is to be detected in the first pattern part is anticipated on the basis of a data signal reproduced by an optical head or the like by using a counter and a pseudo pattern detecting signal is generated so that, even if it fails to detect the pattern detecting signal in the first pattern part, the data demodulation in the first data region will not lack.

11 Claims, 8 Drawing Sheets

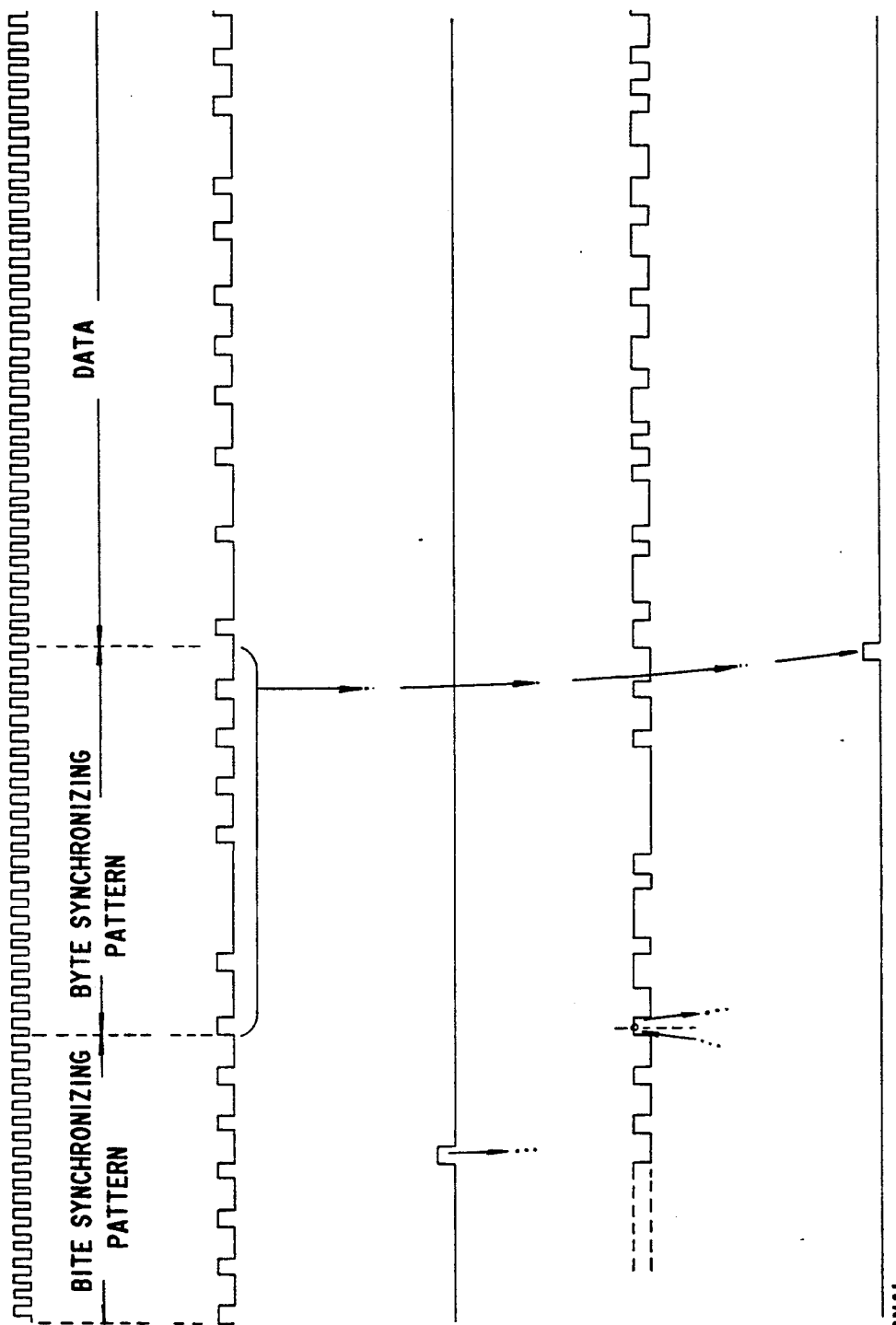
FIG.7a PLL CLOCK
FIG.7b DEVALUING SIGNAL
FIG.7c BIT INTERVAL MEMORIZING CIRCUIT OUTPUT
FIG.7d DEMODULATING DECODER OUTPUT
FIG.7e BYTE SYNCHRONIZING PATTERN DETECTING SIGNAL

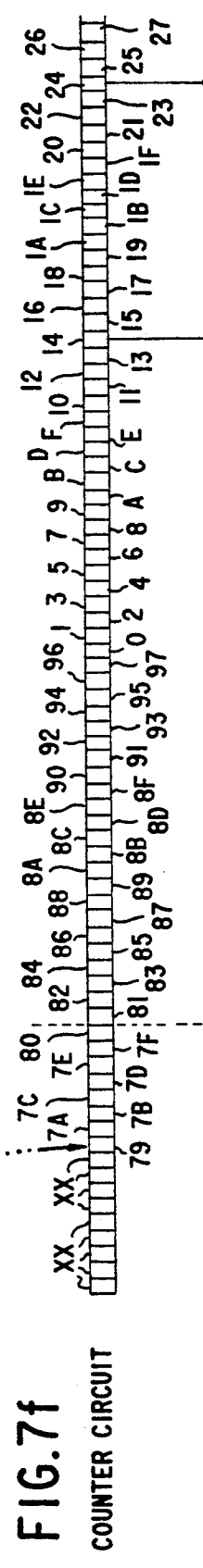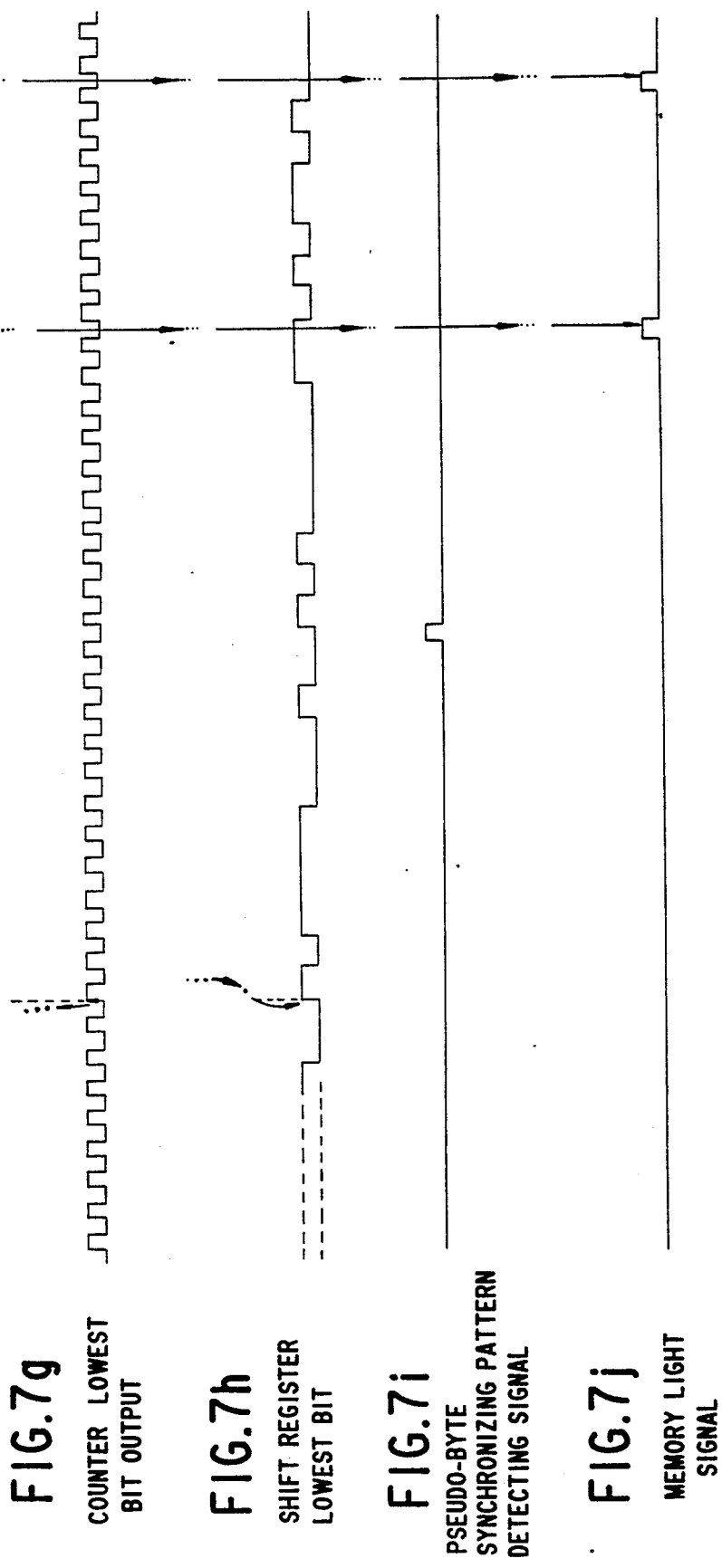
FIG.7f COUNTER CIRCUIT
FIG.7g COUNTER LOWEST BIT OUTPUT
FIG.7h SHIFT REGISTER LOWEST BIT
FIG.7i PSEUDO-BYTE SYNCHRONIZING PATTERN DETECTING SIGNAL
FIG.7j MEMORY LIGHT SIGNAL

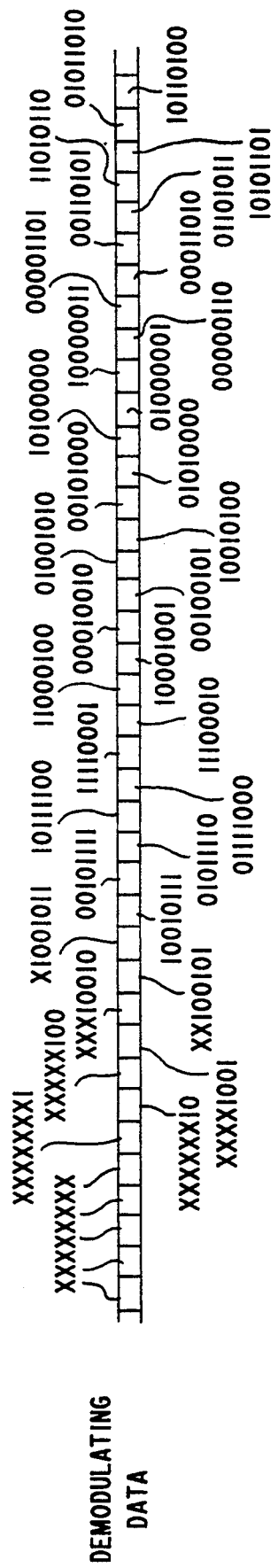

OPTICAL CARD REPRODUCING APPARATUS PROVIDED WITH A FUNCTION OF GENERATING PSEUDO SYNCHRONIZING PATTERN DETECTING SIGNALS

BACKGROUND OF THE INVENTION:

1. Field of the Invention:

This invention relates to an optical card reproducing apparatus which generates a pseudo synchronizing pattern detecting signal ensuring against a failure of the detection of a synchronizing pattern of a top portion of a recording region divided into a plurality in a recording medium.

2. Description of Related Art;

It is well-known to use an optical data recording and reproducing apparatus which can record and reproduce data by the radiation of a light beam instead of a magnetic system type data recording and reproducing apparatus which can record information data in a recording medium by using a magnetic head and reproduce the recorded information data.

An optical disk or optical card is used for the recording medium of the above mentioned optical data recording and reproducing apparatus.

In such recording medium, many tracks are formed on the recording surface, information data are recorded along the respective tracks and the recorded information data are reproduced.

The respective tracks are divided into a plurality of recording regions generally called sectors.

FIG. 1 shows an example of a sector format in an optical card of a generally used prior art.

Bit synchronizing patterns 51 and 52 for synchronizing signal recording regions for generating self clocks are provided at both ends of each sector so that self clocks may be generated by using a PLL (Phase Looked Loop) circuit from bit patterns obtained by scanning the synchronizing patterns 51 and 52.

In the top portions of the first block 53, second block 54, . . . and nth block 55 in which data are actually recorded, there are provided byte synchronizing patterns 56, 57, 58, 59 and 60 as information recording regions representing the top portions of these first block 53, second block 54, . . . and nth block 55. Thus, each sector is divided into n blocks.

In FIG. 1, the synchronizing patterns 51 and 52 are provided on both sides so that the data may be read out of either of the right and left sides FIG. 2A shows an arrangement of data as stored in a memory so that an error correction may be made for the data in case the data can be normally read out. The data of the first block 53 enter the first line, the data of the second block 54 enter the second line and the data of the nth block 55 enter the nth line.

FIG. 2B shows an arrangement of read-out data as stored in a memory in case the byte synchronizing pattern cannot be detected by the influence of a dust or flaw on the optical card in case the data are to be read out of the left side, for example, in FIG. 1.

In such case, the second block 54 will enter the first line which the first block 53 should inherently enter, the third block 54 will enter the second line which the second block should enter, the nth block 55 will enter the (n−1)th line which the (n−1)th block should enter and nothing will enter the nth line which the nth block 55 should enter.

In a data recording and reproducing apparatus using such recording medium as an optical card, a Lead Solomon product sign is often used as an error correcting sign. In such case, as shown in FIG. 2C, first of all, the first error correction (C1 correction) will be made in each line, then, as a result of the C1 correction, the second error correction (C2 correction) will be made in each line.

In the data obtained where the byte synchronizing pattern at the top of the first block cannot be detected as in FIG. 2B, if the C1 correction is made, errors will be able to be corrected as usual except in the nth line but, in case the C2 correction is made, all the data in the respective lines will be erroneous, the error correction will be impossible to carry out and, as a result, this sector will be unable to be read out.

As shown in FIG. 1, in the ordinary sector format, the byte synchronizing patterns are inserted into the data at fixed intervals. Therefore, if only the first byte synchronizing pattern can be correctly detected, even if the subsequent byte synchronizing patterns fail to be detected, in consideration of the periodicity, a pseudo byte synchronizing pattern detecting signal will be produced and, if the data are demodulated by this signal, the data will be able to be correctly read out.

However, as described above, in the conventional data recording and reproducing apparatus, there are problems that, in case the first byte synchronizing pattern can not be detected due to the influence of a dust or flaw, the reference point of the periodicity will not be able to be obtained, therefore no pseudo byte synchronizing pattern detecting signal will be able to be produced and, even if there is no error in any other part of the sector, it will be impossible to read out this sector.

SUMMARY OF THE INVENTION

An object of the present invention is to provide a data reproducing apparatus wherein data can be read out even in case the first byte synchronizing pattern can not be correctly detected.

Another object of the present invention is to provide a data reproducing apparatus high in reliability.

According to the present invention, in a data recording and reproducing apparatus for recording and/or reproducing data demodulated from tracks divided into a plurality of regions, the respective regions are provided with data regions divided into a plurality of blocks and a plurality of byte synchronizing pattern portions indicating the respective top portions of these data regions where the first byte synchronizing pattern portion has a demodulating means which begins to demodulate said data regions with the reproduced timing as a reference; a detecting means for detecting the recording starting points of the respective regions by detecting whether the reproduced signals of the respective regions meet the modulating rules or not; and a pseudo byte synchronizing pattern signal generating means for measuring the data length on the basis of the output of the detecting means and outputting a signal according to the timing corresponding to said first byte synchronizing pattern portions such that the data of the first block may be fully read out. This is accomplished by beginning demodulation of the above mentioned data regions with the output of the above mentioned pseudo byte synchronizing pattern signal generating means in the case where the above mentioned first byte synchronizing pattern part is not reproduced. As a result, a pseudo synchronizing pattern is also generated in case the first byte synchronizing pattern is not detected.

BRIEF DESCRIPTION OF THE DRAWINGS

FIGS. 3 to 7(a–k) relate to an embodiment of the present invention.

FIG. 3 is a block diagram showing the formation of a demodulating circuit in the preferred embodiment.

FIG. 4 is a formation diagram of an optical card recording and reproducing apparatus.

FIG. 5 is an explanatory view showing an optical card on which tracks are formed.

FIG. 6 is a block diagram showing the formation of a sector position detecting circuit.

FIG. 7 is a timing chart view for explaining the preferred operation of the embodiment.

DETAILED DESCRIPTION OF THE PREFERRED EMBODIMENT

The embodiment of the present invention shall be explained in the following with reference to the drawings.

Figure 4:
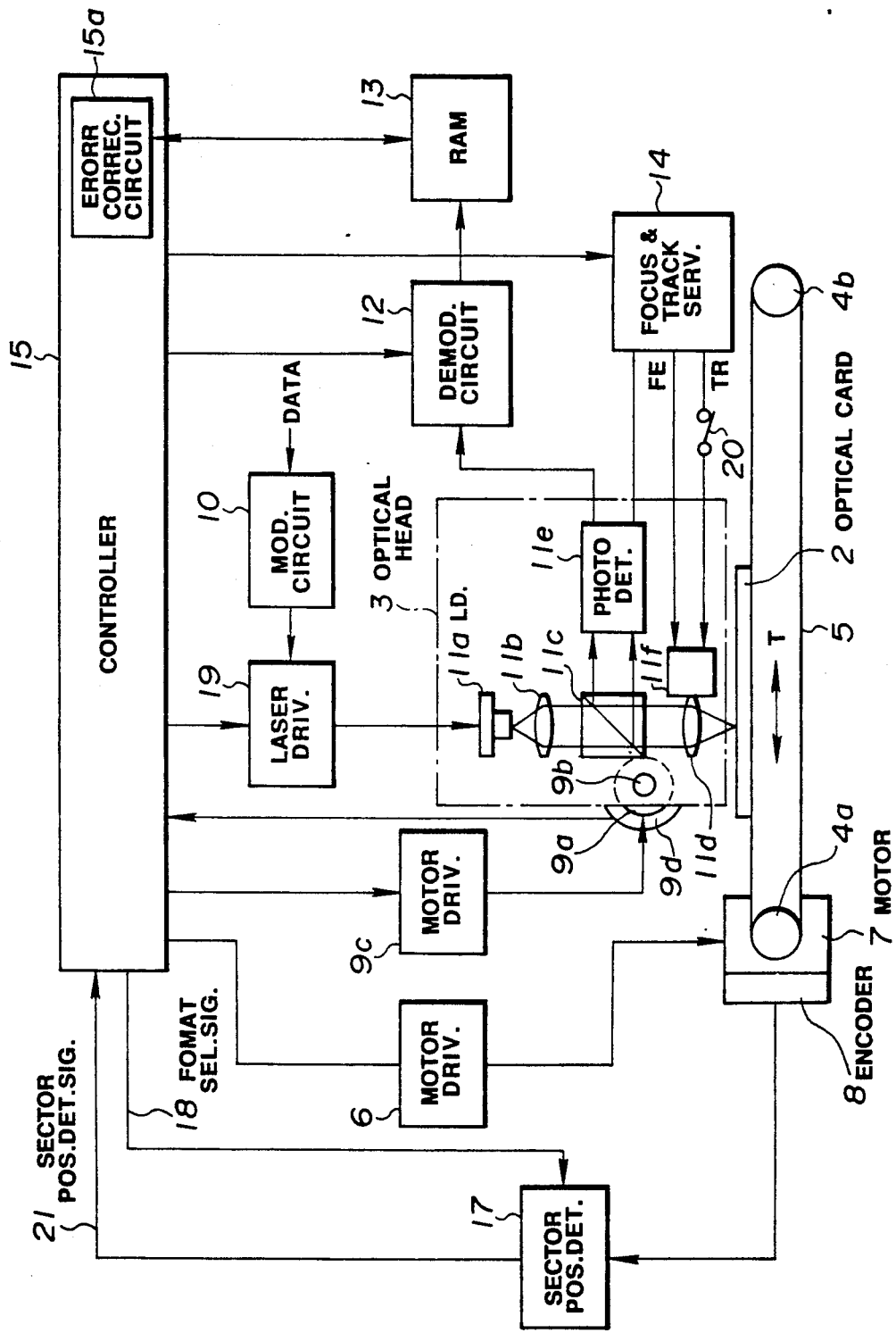

As shown in FIG. 4, in an optical card recording and reproducing apparatus 1 as a data reproducing apparatus of the preferred embodiment, data are recorded and reproduced by moving an optical card 2 in the track direction and an optical head 3 in the direction intersecting at right angles with the track. The optical card 2 is fitted in a predetermined position to a conveying belt 5 hung between pulleys 4a and 4b and is reciprocally conveyed in the direction T parallel with the track direction of the optical card 2 by the drive of a motor 7 controlled in the drive by a motor driving circuit 6 controlled by a controller 15.

The motor 7 is fitted with an encoder 8 for detecting the position (relative to the optical head 3) of the optical card 2 and the output of the encoder 8 is fed to a sector position detecting circuit 17 detecting the sector position.

The optical head 3 is fitted to a screw 9b rotated and driven by a head driving motor 9a controlled in the drive by a motor driving circuit 9c.

When this head driving motor 9a rotates, the optical head 3 will be moved in the direction crossing the track of the optical card 2 and this movement will be detected by an encoder 9d fitted to the head driving motor 9a so that the optical head 3 may be moved near any track.

The above mentioned optical head 3 projects a laser light for writing in or reading out from a laser diode 11a onto the optical card 2 through an optical system formed of a collimator lens 11b collimating the laser light, a beam splitter 11c splitting the beam and an objective lens 11d condensing the light to form a minute light spot. The light reflected by this optical card is condensed by the objective lens 11d, is reflected by the beam splitter 11c, is led by a detector 11e and is photoelectrically converted. The output of this detector 11e is fed to a demodulating circuit 12 and is demodulated. The demodulated data are temporarily memorized in a RAM 13.

The output of the detector 11e is fed to a focus & track servo circuit 14. When the focus error signal FE and track error signal TR of this circuit 14 are fed to a lens actuator 11f driving the objective lens 11d, the focus control and track control will be made so that the light spot will follow the optical head 3 as focused in the focus direction and on the track. By the way, in the oase of seeking a target track, the switch 20 will be switched off and the optical head 3 will be moved in the track crossing direction.

When the demodulated data memorized once in the above mentioned RAM 13 are taken into the controller 15 and an error correcting process or the like is made in an error correcting process part 15a, an actual data reproducing signal and track address information before the modulation of the data recorded in the optical card 2 will be obtained.

In the reproduction of the data, the controller 15 will first output to a sector position detecting circuit 17 a format selecting signal 18 showing the kind of the track format and will select a track format of how many sectors one track is formed of. A low output reading-out light is output from the laser diode 11a through a laser driving circuit 19, the drive of the motor driving circuit 6 is controlled and a desired sector of a desired (target) track is sought on the basis of a sector position detecting signal 21 in response to the track address information demodulated by the demodulating circuit and the track format from the sector position detecting circuit 17 to reproduce the data.

In the case of seeking the above mentioned desired track, the controller 15 will rotate the head driving motor 9a through the motor driving circuit 9c and will move the present track address toward the target track address and, during the movement, it will be judged whether the track address demodulated by the demodulating circuit 12 coincides with the target track address. In case it coincides, the head driving motor 9a will be stopped and the tracking servo will be switched on, that is, the switch 20 will be on. In case the target track address is separated from the present track address by such small distance as less than about several tracks, the track address may be sought by only the movement of the objective lens 11d by the lens actuator 11f.

After the target track is sought, in case the target sector is then sought, the motor 7 moving the optical card 2 will be driven to move the optical card 2 relatively with the optical head 3 on the basis of the sector position detecting signal 21 from the sector position detecting circuit 17. In case the target sector is detected, the data will be reproduced by the data of the data part of this sector.

In recording the data, the same as is mentioned above, first of all, a format selecting signal 18 is output in the sector position detecting circuit 17, the track format is selected, the desired sector of the desired track recording the data is sought and then a writing-in light of a high output is output from the laser diode 11a through the laser driving circuit 19. In this case, the data to be recorded will be modulated by the modulating circuit 10, for example, by such predetermined modulating system as a 2-7 modulation and will he output to the laser driving circuit 19 and, by these modulated data, the light emitting output of the laser diode 11a will become light emitting pulses of a high output and light emitting pulses of a low output and will be recorded as recorded data in the above mentioned sector. In fact, an error correcting signal will be added.

Figure 5:
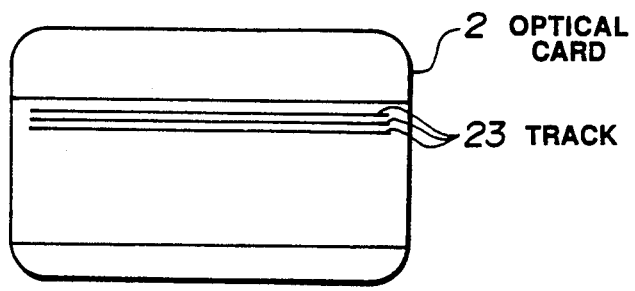

As shown in FIG. 5, in the optical card 2 used in this embodiment, a plurality of respective tracks 23 extending linearly in the lengthwise direction of the card are formed and each track 23 is formed of one sector or a plurality of sectors. A track address (not illustrated) inherent to that track is formed at one or each end of each track 23.

Figure 1:
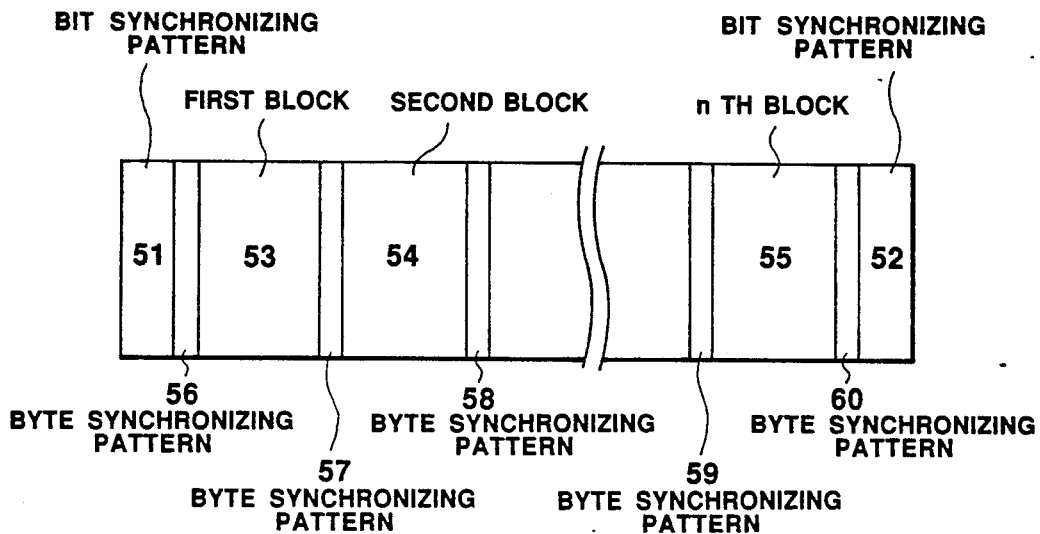
FIG. 1 is an explanatory view showing an example of a sector format in an optical card of a prior art example.

The format of each sector is the same as is shown in FIG. 1. A byte synchronizing pattern representing the top portion of the data region is formed in at least one end corresponding to the top portion of each data region of each block divided into a plurality. Also, a bit synchronizing pattern for producing a reading-out reference clock is formed at at least one end which becomes the top portion of a plurality of the blocks or data regions.

Figure 6:
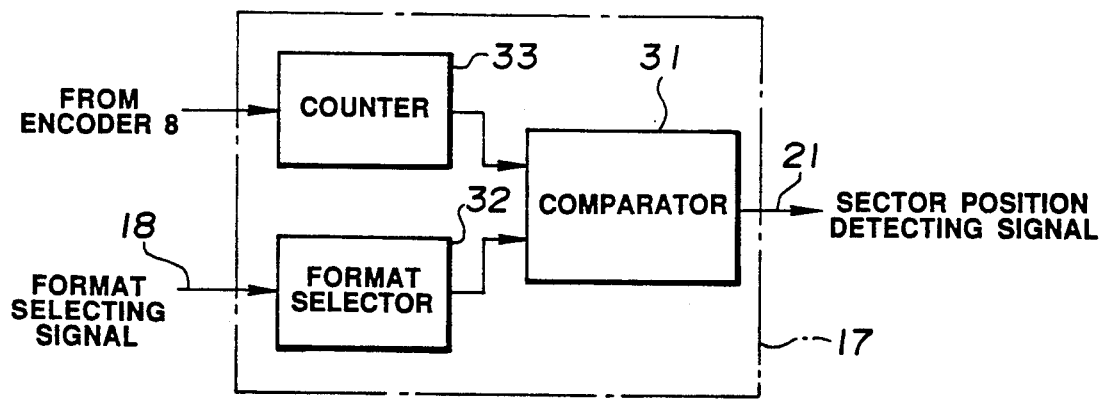

When the optical head 3 comes to the position on the optical card 2 corresponding to the section of the sectors, the above mentioned sector position detecting circuit 17 will output a sector position detecting signal 21 in response to the track format selected by the format selecting signal 18 from the controller 15. FIG. 6 shows a circuit formation of its example.

This sector position detecting circuit 17 comprises a format selector 32 outputting to a comparator 31 a predetermined value corresponding to the position of the section of the sectors on the optical card 2 in response to the input format selecting signal 18, a counter 33 counting the output signals from the encoder 8 and the comparator 31 comparing the output count value from the counter 33 and the predetermined value output from the format selector 32 with each other and outputting a sector position detecting signal when they coincide with each other.

The counter 33 must be reset at a point (for example, at the edge of the optical card) which becomes a reference of the position of the optical card 2 for the optical head 3. This sector position detecting signal 21 is output to the controller 15 which can judge a desired sector by counting this signal.

Figure 3:
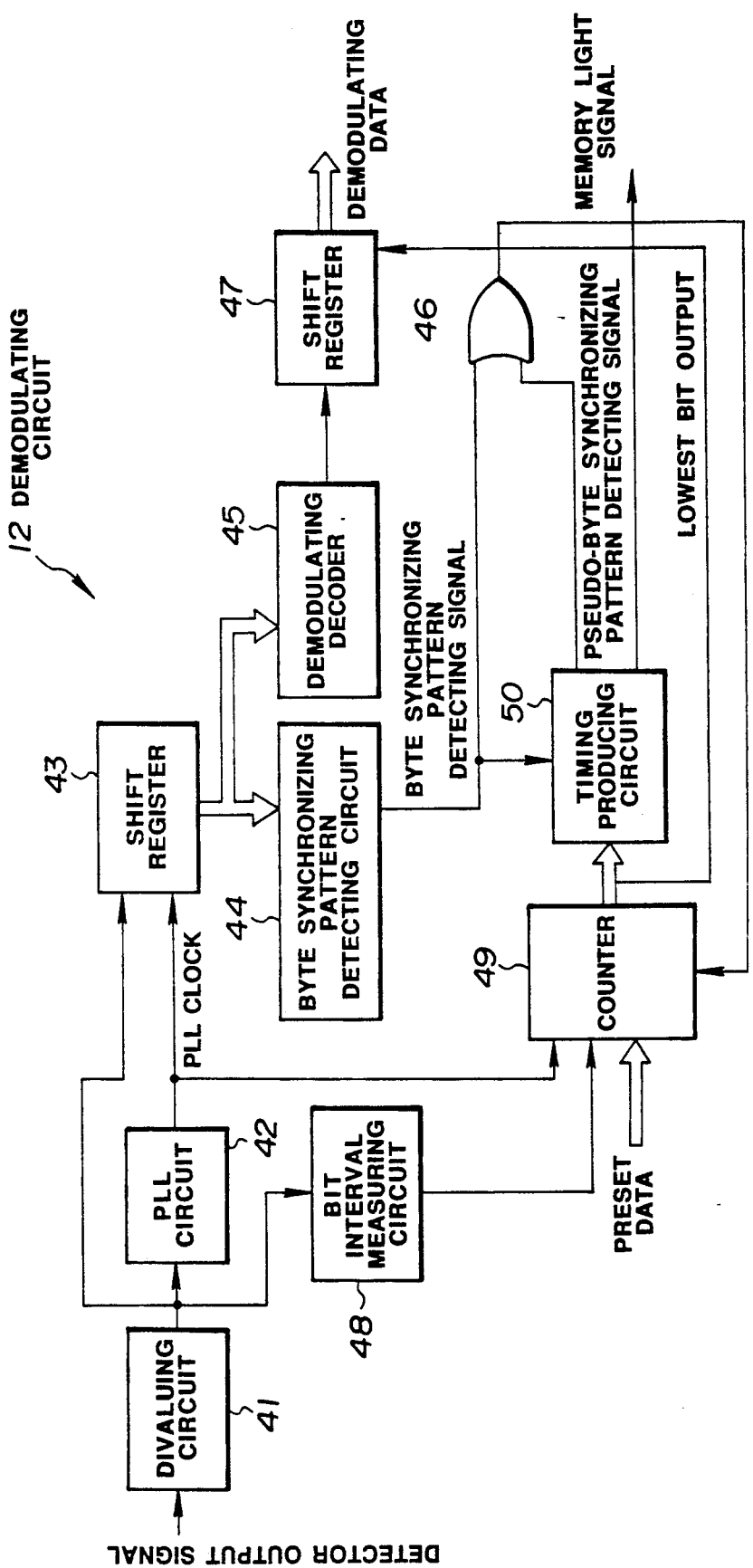

The demodulating circuit 12 which is a feature of this embodiment shall be explained in detail in the following with reference to FIGS. 3 and 7. FIG. 3 shows the formation of the demodulating circuit 12. In this embodiment, a 2-7 modulation is used as a modulating system of the data part. The data of 8 bytes are to enter the space (that is, one block) between the byte synchronizing pattern and the next byte synchronizing pattern.

The output signal of the detector 11e is input into a divaluing circuit 41, a divaluing signal produced by this divaluing circuit 41 is input into a PLL circuit 42 and a PLL clock synchronized with the divaluing signal is produced. This PLL clock samples for each PLL clock the divaluing signal applied to the clock input end of a shift register 43 and input from serial data input ends and outputs the parallel data sampled from parallel output ends to a byte synchronizing pattern detecting circuit 44 and demodulating decoder 45.

The above mentioned byte synchronizing pattern detecting circuit 44 compares whether the output data of the shift register 43 coincide with the byte synchronizing patterns memorized in advance in a ROM or the like. In case they coincide, the output data will be judged to be byte synchronizing synchronizing patterns and a byte synchronizing pattern detecting signal will be output to an OR gate 46.

The above mentioned decoder 45 demodulates the 2-7 modulated parallel data from the output data of the shift register 43 and outputs them to the second shift register 47.

Also, the above mentioned divaluing signal is input into a bit interval measuring circuit 48, the pulse interval, that is, the interval of the bits recorded on the optical card is measured from the divaluing signal and it is judged whether the measured bit interval is within the rule of the 2-7 modulation or not. When the pulses within the modulation rule are detected a prescribed number of times, the pulses starting the measurement will be output to the counter 49 as a measuring means.

That is to say, in this bit interval measuring circuit 48, the bit interval is measured from the divaluing signal and it is judged whether this detected bit interval meets the rule of the 2-7 modulation or not. When the divaluing signal meeting this rule is detected a prescribed number of times (3 in FIG. 7), the bit synchronizing pattern part of the top portion of the sector will be judged to be scanned and the pulses will be output to the counter 49 as a recorded data length measuring means. By this bit interval measuring circuit 48, high frequency clocks can be gated to the counter only for the bit interval time by using, for example, a divaluing signal and it can be judged whether the number of clocks coincides with any counted number of patterns meeting the rule of the 2-7 modulation or not.

The above mentioned counter 49 makes the pulse output from the bit interval measuring circuit 48 a preset signal, presets predetermined preset data output from the controller 15, counts up PLL clocks as clock signals and measures the timing in which the first byte synchronizing pattern is to be detected.

The output of this counter 49 is input into a timing producing circuit 50 formed of a comparator or the like. When the counter output value reaches a predetermined value corresponding to the timing in which the first byte synchronizing pattern is to be detected, a pseudo byte synchronizing pattern detecting signal will be output to an OR circuit 46 and a memory light signal will be output to the RAM 13.

The above mentioned OR circuit 46 applies to the resetting terminal of the counter 49 a logical sum signal of the byte synchronizing pattern detecting signal output from the byte synchronizing pattern detecting circuit 44 and the pseudo byte synchronizing pattern detecting signal output from the timing producing circuit 50 and resets the counter 49.

That is to say, in case the first byte synchronizing pattern detecting signal is not detected, an operation instead of the byte synchronizing pattern detecting signal will be made by the pseudo byte synchronizing pattern detecting signal. This counter 49 measures the data length or timing for generating the pseudo byte synchronizing pattern detecting signal by the above mentioned preset data and is usually reset just after this generation. (In case the byte synchronizing pattern detecting signal is generated just before the pseudo byte synchronizing pattern detecting signal is generated, the generation of the pseudo byte synchronizing pattern detecting signal will be suppressed.)

When this reset timing becomes a reference timing of the demodulating operation and the count value of this counter 49 reaches a predetermined value, the operation of writing the data already demodulated before this time into the RAM 13 through the shift register 47 will be started, that is, the demodulating operation will be substantially started. When the above mentioned counter 49 is reset, the measurement will be made until the pseudo byte synchronizing pattern detecting signal is generated by the timing when the byte synchronizing pattern detecting signal is detected by the byte synchronizing pattern part in the top portion of the next block.

The lowest bit output of the above mentioned counter 49 is input into the second shift register 47 which samples the data output from the demodulating decoder 45 in each lowest bit output and outputs the demodulated data out of the parallel output ends.

The byte synchronizing pattern detecting signal of the byte synchronizing pattern detecting circuit is input also into the timing producing circuit 50 which is provided with a suppressing circuit which will not output the pseudo byte synchronizing pattern detecting signal for a fixed period (for example, a period when the output value of the counter 47 is OOH to AOH, that is, one block including the byte synchronizing pattern) after this byte synchronizing pattern detecting signal is input in case the byte synchronizing pattern detecting signal is input before the timing when the first pseudo byte synchronizing pattern detecting signal is generated (because, if the pseudo byte synchronizing pattern detecting signal is then generated, the measuring operation of the counter 49 measuring the byte synchronizing pattern detecting signal as a reference timing will be disturbed).

Figure 8:
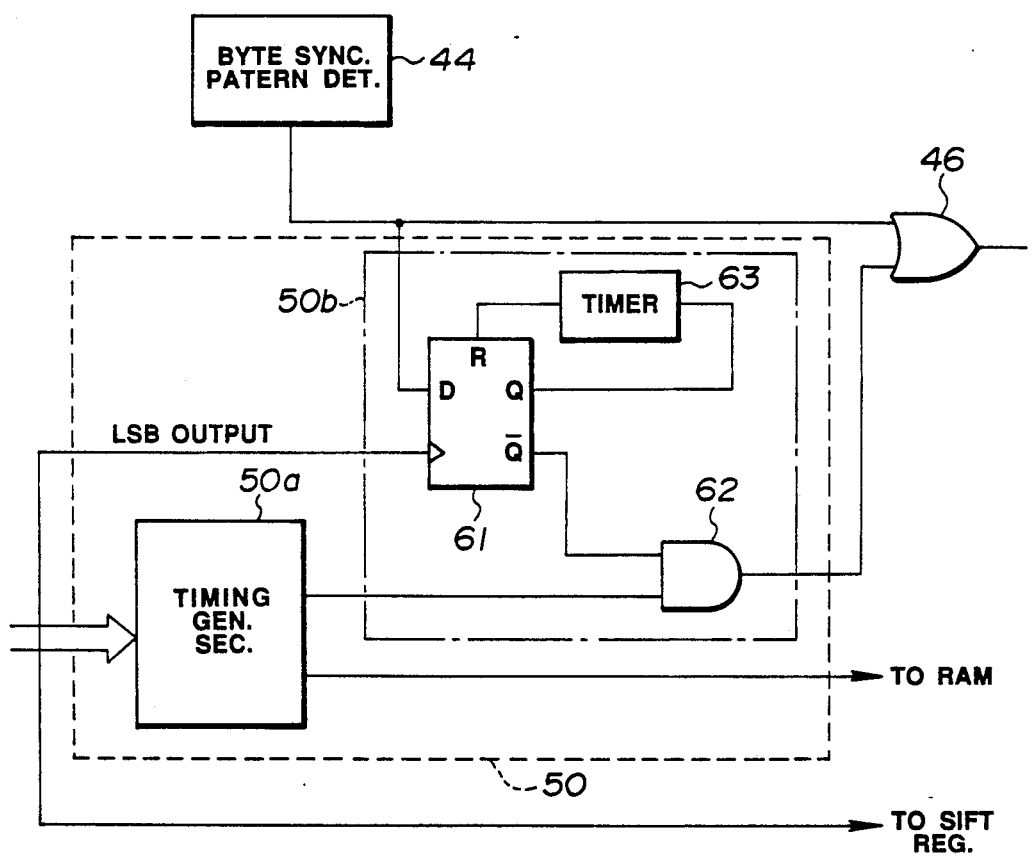
FIG. 8 is a circuit diagram showing an example of a suppressing circuit.

FIG. 8 shows an example of a suppressing circuit 50b. The output of the byte synchronizing pattern detecting circuit 44 is applied to the input end D of a latch circuit 61 and is latched with the lowest bit output of the counter 49 as a clock. The inverted output $\overline{Q}$ of this latch circuit 61 is output to an AND circuit 62 and gates the passage of the pseudo byte synchronizing pattern detecting signal output from the timing producing part 50a (the timing producing circuit 50 less the suppressing circuit 50b) and input into this AND circuit 62.

That is to say, (1) if the byte synchronizing pattern detecting signal is generated prior to the pseudo byte synchronizing pattern detecting signal generating timing. the AND circuit 62 will not pass the pseudo byte synchronizing pattern detecting signal, (2) in the reverse case, the pseudo byte synchronizing pattern detecting signal will be output to the OR circuit 46 through the AND circuit 62 and then the byte synchronizing pattern detecting signal will be output and (3) in case the byte synchronizing pattern detecting signal is not output, only the pseudo byte synchronizing pattern detecting signal will be output. The latch circuit 61 has the output Q delayed for a fixed period by the timer 63 and is then reset.

This suppressing circuit 50b prefers the byte synchronizing pattern detecting signal to the pseudo byte synchronizing pattern detecting signal with respect to the reference timing. This is evident for (1) and (3) and is understood for (2) from the fact that the counter 49 is reset again by the later byte synchronizing pattern detecting signal.

The reproducing operation of the thus formed demodulating circuit 12 shall be explained in the following with reference to the timing chart in FIG. 7.

First of all, in the PLL circuit 42, from the bit synchronizing pattern (in this example, the bit synchronizing pattern is 1001001100100100100) added to the top of the data in the divaluing signal shown in FIG. 7b, a PLL clock synchronized to the above mentioned pattern is produced as shown in FIG. 7a.

When the above mentioned divaluing signal is input into the bit interval measuring circuit 48 and detects three pulses meeting a predetermined modulation (2-7 modulation in this case) rule, the pulse shown in FIG. 7c will be output and this pulse will be output to the counter 49 as a presetting signal. Therefore, the counter 49 presets as shown in FIG. 7f the present data (79H in this case) fed from the controller 15 by this presetting signal. The value of the data 79H is a value obtained by reversely calculating in advance the position in which this pulse is output from the position (timing) in which the first byte synchronizing pattern is to be detected. After this counter 49 is preset, the preset data 79H are counted up for each PLL clock.

The above mentioned divaluing signal is serially taken into the shift register 43 by the PLL clock, is converted to parallel data from the shift register 43 and is input into the byte synchronizing pattern detecting circuit 44. Therefore, following the bit synchronizing pattern in the divaluing signal, a byte synchronizing pattern (in this example, the byte synchronizing pattern is 100010000000100100100) appears. By the byte synchronizing pattern detecting circuit 44, as shown in FIG. 7e, a byte synchronizing pattern detecting signal is output.

The parallel data of the above mentioned shift register 43 are output to the shift register 47 through the demodulating decoder 45. For example, if the output of the demodulating decoder 45 is of FIG. 7d, it will be taken into the shift register 47 by the rising edge of the lowest bit of the counter 49 shown in FIG. 7g. Therefore, the lowest bit of this shift register 47 will be as shown in FIG. 7h.

When the above mentioned byte synchronizing pattern detecting signal is output, this detecting signal will be applied to the resetting terminal of the counter 49 through the OR circuit 46 and this counter 49 will be reset as shown in FIG. 7f.

The position in which this counter 49 is reset becomes a reference point for the demodulating operation. In the timing producing circuit 50 from the output value of this reset counter 49, the (demodulated) data shown in FIG. 5(k) and output from the shift register 47 by the memory light signal (generated in this example when the output value of the counter 49 is 14H, 24H, ... as shown in FIG. 7f) shown in FIG. 7j and produced by the circuit 50 are written into the RAM 13 as actual demodulated data.

The above is the operation in case the byte synchronizing pattern at the top of the selector is correctly detected. (In the recording mode in the case that this byte synchronizing pattern is correctly detected, the data modulated in the data region adjacent to the byte synchronizing pattern are recorded.)

The reproducing operation in the case that the byte synchronizing pattern at the top is erroneous and the byte synchronizing pattern detecting signal is not generated shall be explained in the following. Even in case the divaluing signal produces an error under the influence of a dirt or flaw on the optical card, once locked, the PLL clock will oscillate substantially at its frequency and therefore the counter 49 will be able to accurately show the position of the bit on the optical card. Further, in this embodiment, by the bit interval measuring circuit 48, it is possible to start the measurement, that is, to sense the data recording starting point in the bit synchronizing pattern part at the top of the sector and therefore the position in which the first byte synchronizing pattern is to be detected can be anticipated.

When the preset data 79H are preset by the presetting signal from the bit interval measuring circuit 48, the counter 49 will subsequently continue the counting operation in response to the PLL clock. When the output value of this counter 49 becomes 97H, as shown in FIG. 7i, the timing producing circuit 50 will output a pseudo byte synchronizing pattern detecting signal by the next PLL clock and thereby the counter 49 will be reset.

The value of this 97H is {24 bits (byte synchronizing pattern)+128 bits (8 bits of data within 1 block)−1 and is the number of bits of 1 block−1. By the OR circuit 46, the OR of the byte synchronizing pattern detecting signal and pseudo byte synchronizing pattern detecting signal is taken and the output becomes a resetting signal of the counter 49. Therefore, the subsequent operation is made exactly the same as in the case that the byte synchronizing pattern is normally detected.

Figures 2A, 2B, 2C:
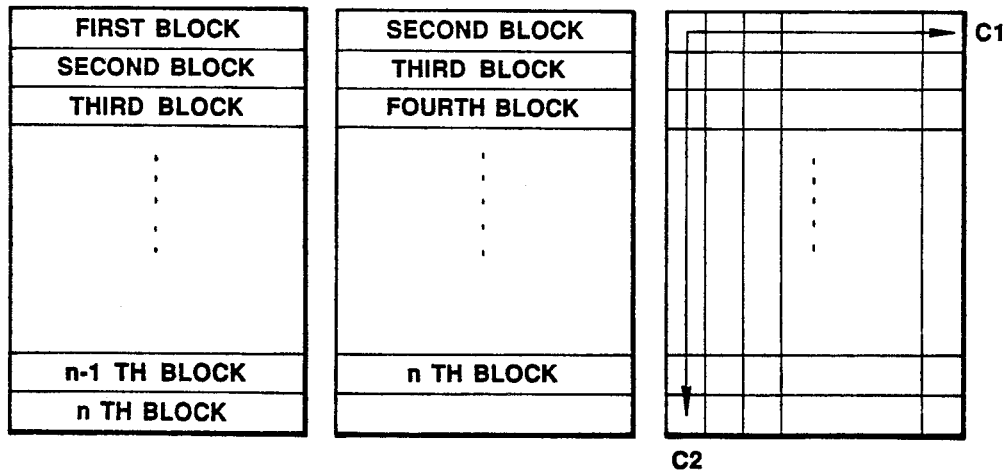
FIG. 2(a–c) is an explanatory view showing demodulated data as memorized in a memory.

In case dirt or the like is mistaken for a bit and is divalued and the presetting signal from the bit interval measuring circuit 48 is (that is, on the left side of the position in FIG. 7c) output too early, the pseudo byte synchronizing pattern detecting signal will be output first but, if the byte synchronizing pattern can be normally detected, the counter 49 will be reset again and therefore the data will not be able to be correctly demodulated. At this time, in case the byte synchronizing pattern can not be detected, by the pseudo byte synchronizing pattern detecting signal, the counter 49 will be reset in a wrong position and therefore the data will not be able to be correctly demodulated but will not be demodulated with the second block as the first block by skipping the first block and therefore the first block will not be omitted as shown in FIG. 2B. Therefore, the data of this block can be restored by the error correcting process.

On the other hand, in case the presetting signal from the bit interval measuring circuit 48 is output late (that is, on the right side of the position in FIG. 7c), if it is operated as it si, the data will not be able to be correctly demodulated and therefore, as a countermeasure, the pseudo byte synchronizing pattern detecting signal will not be output for a fixed period (for example, a period in which the output value of the counter 47 is OOH to AOH) after the byte synchronizing pattern detecting signal is generated.

Therefore, according to this embodiment, even in case the byte synchronizing pattern detecting signal is not detected in the first byte synchronizing pattern part, the pseudo byte synchronizing pattern detecting signal will be able to be generated. Therefore, a reproducing apparatus capable of preventing in advance the demodulating operation lacking the first block data from being made and high in the data demodulating function, that is, the function of reading out the recorded data can be realized. Also, the function of reading out the recorded data can be made so high that the reliability of the reproducing apparatus can be elevated.

The suppressing circuit 50b in FIG. 8 may be formed of a monostable multivibrator instead of the latch circuit 61 and timer 63.

The above mentioned embodiment has been explained with the apparatus for recording and reproducing data in the optical card as a recording medium. However, it is evident that, even in the case that at least a reproduction is made in a disk-like recording medium on which many tracks are concentrically circularly or spirally formed, if the sectors of the respective tracks are sectioned into a plurality of blocks and the format of the sectors is of such structure (in the case of the disk-like recording medium, the rotating direction is one direction and therefore the bit synchronizing pattern 52 in FIG. 1 is not necessary) as is shown in FIG. 1, the present invention will be able to be applied in the same manner.

Also, even in the case of the optical card, in case the card is moved in only one direction along the track, the bit synchronizing pattern 52 in FIG. 1 will not be necessary. In such case, the bit synchronizing pattern 51 side will correspond to the top side end of each block and the light spot radiated to this sector will be scanned from the left side to the right side.

Further, the present invention can be applied not only to a reproducing apparatus using an optical recording medium and optical pickup means but also to another reproducing apparatus reproducing data by using a magnetic pickup means by a magnetic head or the like.

As described above, according to the present invention, in a means for detecting a byte synchronizing pattern provided in each top portion of a plurality of blocks forming a sector, in case this byte synchronizing pattern is not detected, a pseudo byte synchronizing pattern detecting signal will be generated, therefore, even in case the first byte synchronizing pattern can not be correctly detected, the demodulation will be able to be started with the timing signal corresponding to the record starting point of the sector as a reference and the data of the first block will be able to be positively read out.

What is claimed is:

1. An optical data reproducing apparatus comprising:
   an optical recording medium having data regions which can respectively record data for respective linear tracks and which are sectioned into a plurality of data sub-regions contained in said data regions, wherein byte synchronizing pattern portions indicating respective top portions of respective data sub-regions and formed at at least one end of each of said data sub-regions and bit synchronizing pattern portions producing synchronized synchronizing clocks and formed at at least one end of each of said data regions;
   an optical pickup means provided with a light beam generating means for generating a light beam, an optical system for condensing and radiating said light beam to said optical recording medium and a photodetector for receiving a reflected light in said optical recording medium;
   a synchronizing clock producing means for producing said synchronizing clock from the output signal of said photodetector;
   a byte synchronizing pattern detecting means for detecting said respective byte synchronizing pattern portions by using said synchronizing clock and generating a byte synchronizing pattern detecting signal;
   a pseudo byte synchronizing pattern generating means for anticipating a first timing when a first byte synchronizing pattern portion adjacent to said bit synchronizing pattern portion is detected by using said synchronizing clock and for generating a pseudo byte synchronizing pattern detecting signal based upon said timing; and
   a demodulating means for starting demodulation of the data recorded in said data sub-regions on the basis of a second timing corresponding to generation of at least one of said byte synchronizing pattern detecting signal generated by said byte synchronizing pattern detecting means and said pseudo byte synchronizing pattern detecting signal generated by said pseudo byte synchronizing pattern detecting means.

2. An optical data reproducing apparatus according to claim 1 wherein said demodulating means has a suppressing means for suppressing the generation of said pseudo byte synchronizing pattern detecting signal based upon said second timing of said byte synchronizing pattern detecting signal.

3. An optical data reproducing apparatus according to claim 1 wherein said demodulating means causes said byte synchronizing pattern detecting signal to be preferred over said pseudo byte synchronizing pattern detecting signal.

4. An optical data reproducing apparatus according to claim 1 wherein said optical recording medium is an optical card on which said respective tracks are linearly formed.

5. An optical data reproducing apparatus according to claim 1 wherein said demodulating means has a judging means for judging whether or not the output signal of said photodetector in the case of reproducing said bit synchronizing pattern part meets a predetermined modulating rule so that, when a predetermined number of the data meeting said modulating rule are detected, a pseudo byte synchronizing pattern detecting signal for starting the measurement of said first timing will be output to said pseudo byte synchronizing pattern outputting means.

6. An optical data reproducing apparatus according to claim 1 wherein said data is recorded by a predetermined modulating system in said data regions.

7. An optical data reproducing apparatus according to claim 1 wherein said demodulating means has an error correcting processing means correcting processing errors for demodulated data recorded in said data regions.

8. An optical data reproducing apparatus according to claim 4 having an optical card conveying means moving said optical card in the direction parallel with said track.

9. An optical data reproducing apparatus according to claim 1 having a head moving means moving said optical head in the direction intersecting at right angles with said track.

10. A data reproducing apparatus comprising:
a recording medium having data regions which can respectively record data for respective linear tracks and which are sectioned into a plurality of data sub-regions contained in said data regions, wherein byte synchronizing pattern portions indicating respective top portions of the respective data sub-regions and formed at at least one end of each of said data sub-regions and bit synchronizing pattern portions producing synchronized synchronizing clocks and formed at at least one end of each of said data regions;
a synchronizing clock producing means for producing said synchronizing clock from an electric signal reproduced through a pickup means;
a byte synchronizing pattern detecting means for detecting said respective byte synchronizing pattern portions by using said synchronizing clock and outputting a byte synchronizing pattern detecting signal;
a pseudo byte synchronizing pattern outputting means for anticipating a first timing when a first byte synchronizing pattern portion adjacent to said bit synchronizing pattern portion is detected by using said synchronizing clock and outputting a pseudo byte synchronizing pattern detecting signal based upon said timing; and
a demodulating means for starting demodulation of the data recorded in said data sub-regions on the basis of an outputting timing corresponding to an output of at least one of said byte synchronizing pattern detecting signal and said pseudo byte synchronizing pattern detecting signal.

11. A data reproducing apparatus according to claim 10 wherein said recording medium is an optical recording medium.

* * * * *